United States Patent
Hama et al.

(10) Patent No.: US 12,315,202 B2
(45) Date of Patent: May 27, 2025

(54) IMAGE PROCESSING DEVICE AND IMAGE PROCESSING METHOD

(71) Applicant: KOBELCO CONSTRUCTION MACHINERY CO., LTD., Hiroshima (JP)

(72) Inventors: Ryota Hama, Hiroshima (JP); Yusuke Fujiwara, Hiroshima (JP); Yoichiro Yamazaki, Tokyo (JP); Seiji Saiki, Tokyo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 436 days.

(21) Appl. No.: 17/921,138

(22) PCT Filed: Apr. 28, 2021

(86) PCT No.: PCT/JP2021/017102
§ 371 (c)(1),
(2) Date: Oct. 25, 2022

(87) PCT Pub. No.: WO2021/230093
PCT Pub. Date: Nov. 18, 2021

(65) Prior Publication Data
US 2023/0177732 A1    Jun. 8, 2023

(30) Foreign Application Priority Data
May 15, 2020  (JP) .................................. 2020-086362

(51) Int. Cl.
*G06T 9/00* (2006.01)
*G06V 10/25* (2022.01)
*G06V 10/74* (2022.01)

(52) U.S. Cl.
CPC ................ *G06T 9/00* (2013.01); *G06V 10/25* (2022.01); *G06V 10/761* (2022.01)

(58) Field of Classification Search
CPC ......... G06V 10/761; G06V 10/25; G06T 9/00
See application file for complete search history.

(56) References Cited

U.S. PATENT DOCUMENTS

| | | |
|---|---|---|
| 2021/0062473 A1 | 3/2021 | Ding et al. |
| 2021/0291733 A1 | 9/2021 | Ding et al. |
| 2021/0381197 A1 | 12/2021 | Otani et al. |

FOREIGN PATENT DOCUMENTS

| | | | |
|---|---|---|---|
| JP | 2006132265 A | * | 5/2006 |
| JP | 2006282039 A | * | 10/2006 |

(Continued)

*Primary Examiner* — Wednel Cadeau
(74) *Attorney, Agent, or Firm* — Carrier, Shende & Associates P.C.; Joseph P. Carrier; Fulchand P. Shende

(57) ABSTRACT

A device or the like capable of improving continuity of a moving image outputted to an image output device of a remote operation device even in circumstances where an inter-frame difference of the moving image becomes large. When it is predicted that a data amount of a captured image is to exceed a threshold in consideration of a detection result of a moving mode of a working machine, high frequency components exceeding a specified frequency in a second specified image area excluding a first specified image area of the captured image are eliminated. Thus, the data amount of the captured image is reduced so that the data amount becomes equal to or smaller than the threshold. Then, not only inter-frame continuity of the first specified image area of an environment image outputted to an image output device of a remote operation device but also visibility by an operator is improved.

5 Claims, 12 Drawing Sheets

(56) References Cited

FOREIGN PATENT DOCUMENTS

| | | | |
|---|---|---|---|
| JP | 2018-021395 A | 2/2018 | |
| WO | 2015/155878 A1 | 10/2015 | |
| WO | WO-2020044834 A1 * | 3/2020 | .............. E02F 9/205 |
| WO | 2020/095830 A1 | 5/2020 | |
| WO | WO-2020090985 A1 * | 5/2020 | ............... B60R 1/23 |

* cited by examiner

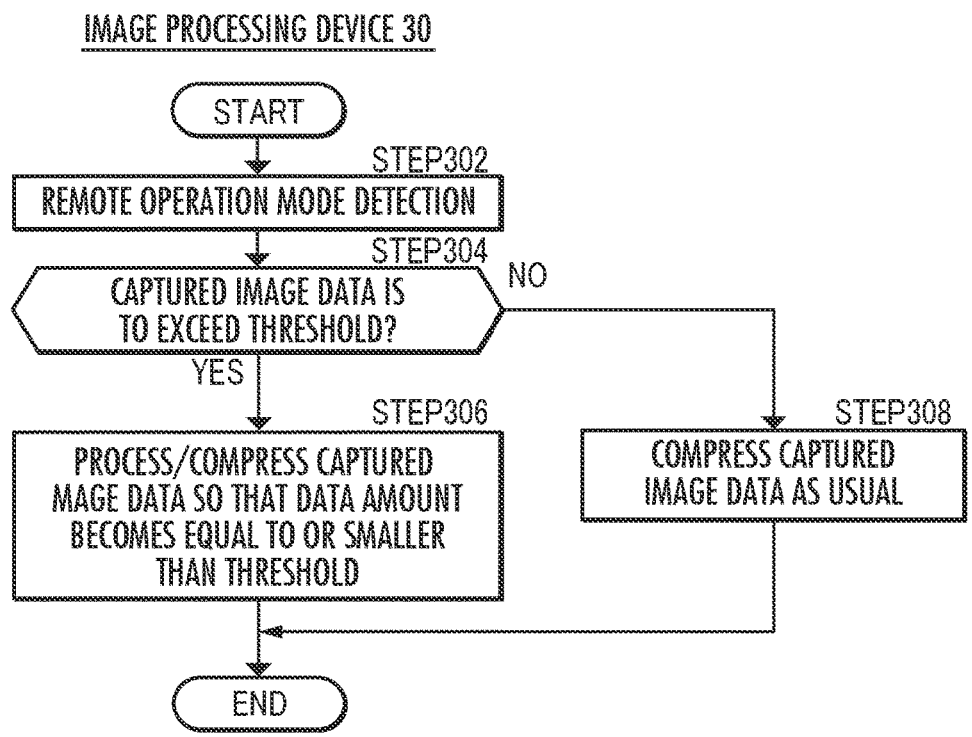

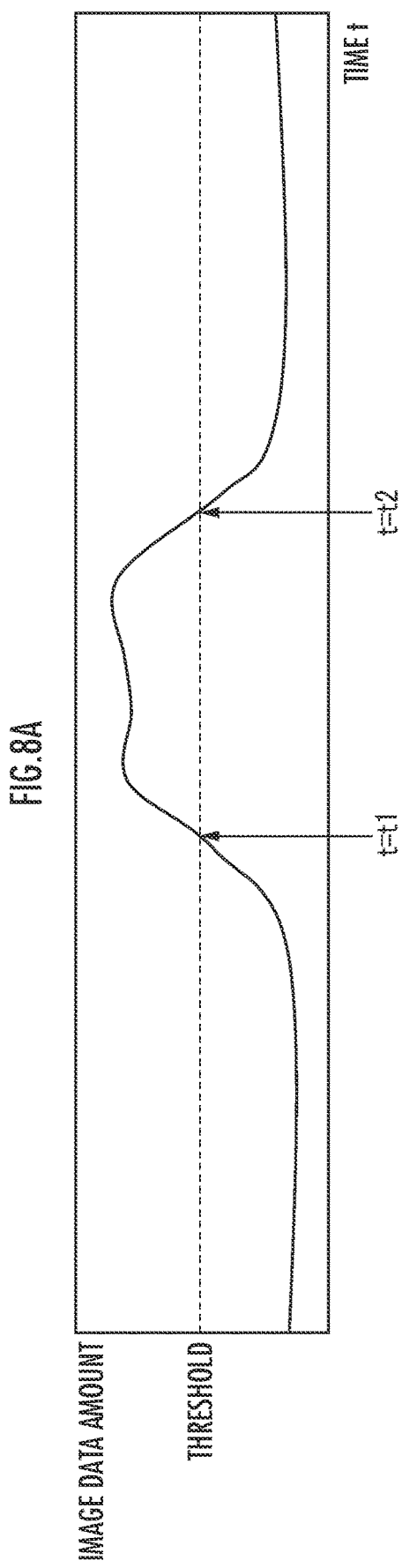

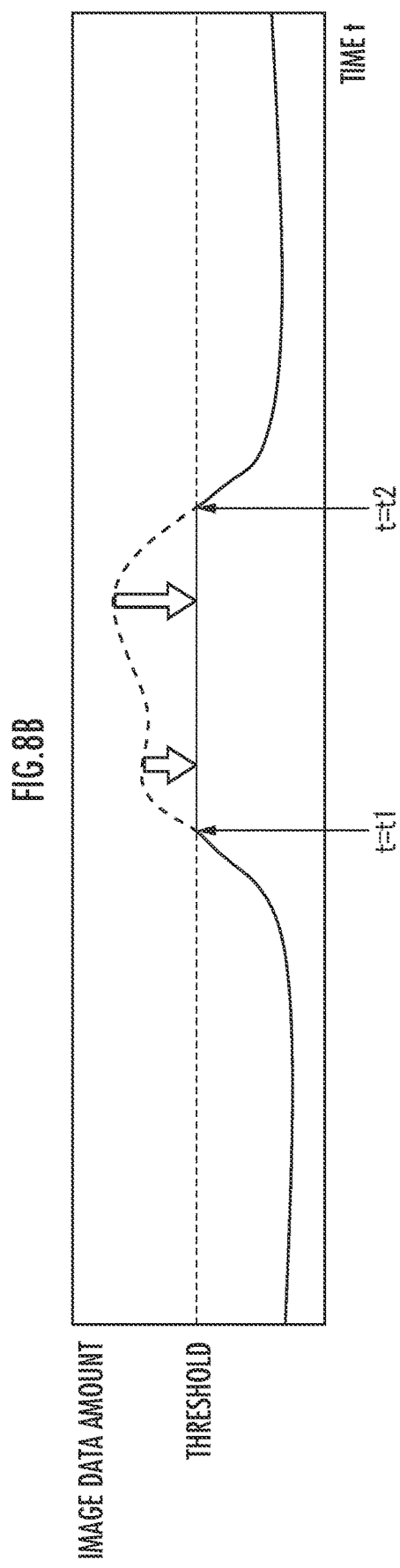

IMAGE PROCESSING DEVICE AND IMAGE PROCESSING METHOD

TECHNICAL FIELD

The present invention relates to an image processing technology.

BACKGROUND ART

A construction machine at a site is connected by a wireless network, and in a case where a vehicle body greatly moves such as moving and turning, a direction and a position of an antenna subsidiary to the construction machine change accompanying a movement of the construction machine. Thus, there is a possibility that data lacks since a radio propagation environment between a wireless base station and the construction machine changes and a line capacity instantly decreases. The lack of data lowers visibility of a monitor image and lowers work efficiency during a remote operation.

Accordingly, a technology for enabling communication which is tough against the change of a communication environment, reducing disturbance of a video image and improving work efficiency during an operation when remotely operating a construction machine has been proposed (for example, see Patent Literature 1). Specifically, second data is generated from first data generated by compressing video data by a video encoder and a correction data generation rate set according to an actuator driven in a construction machine The "correction data generation rate" is a ratio of correction data to the first data. The "correction data" is the data generated for correction by using the first data. Then, third data for which the first data and the second data are combined is transmitted from the construction machine to a maneuvering device, and the third data is decoded and then displayed by a monitor of the maneuvering device.

CITATION LIST

Patent Literature

Patent Literature 1: Japanese Patent Laid-Open No. 2018-021395

SUMMARY OF INVENTION

Technical Problem

However, in circumstances where an inter-frame difference of a moving image indicating a situation of a working machine and an environment thereof becomes large, such as a case where a work attachment of the working machine such as a hydraulic shovel rapidly moves, an amount of moving image data after compression by a video encoder temporarily increases. Therefore, the moving image data amount after the compression becomes excessive even when there is no decline of a line capacity and there is a possibility that discontinuity or the like of the moving image outputted to an image output device of a remote operation device occurs.

Therefore, an object of the present invention is to provide a device or the like capable of improving continuity of a moving image outputted to an image output device of a remote operation device even in circumstances where an inter-frame difference of the moving image becomes large.

Solution to Problem

An image processing device of the present invention comprises: a state detection element for detecting a remote operation mode of a working machine by a remote operation device or a moving mode of the working machine; an image prediction element configured to predict whether or not a data amount of a captured image indicating the captured image of the working machine and an environment thereof captured by an actual machine image capturing device is to exceed a threshold, based on the remote operation mode of the working machine by the remote operation device or the moving mode of the working machine detected by the state detection element; and an image compression element configured to eliminate high frequency components exceeding a specified frequency in a second specified image area excluding a first specified image area of the captured image on condition that it is predicted that the data amount of the captured image is to exceed the threshold by the image prediction element.

According to the image processing device of the configuration, in a case where it is predicted that the data amount of the captured image is to exceed the threshold in consideration of a detection result of the remote operation mode of the working machine by the remote operation device or the moving mode of the working machine, the high frequency components exceeding the specified frequency in the second specified image area excluding the first specified image area of the captured image are eliminated. Thus, the data amount of the captured image is reduced, and not only inter-frame continuity of the first specified image area of the image outputted to an image output device of the remote operation device but also visibility by an operator is improved.

BRIEF DESCRIPTION OF DRAWINGS

FIG. 5 is an explanatory diagram regarding a second function of the remote operation support device.

FIG. 6A is an explanatory diagram regarding compression of a data amount of a captured image.

FIG. 8A is an explanatory diagram regarding a time change mode before reducing the data amount of the captured image.

FIG. 8B is an explanatory diagram regarding a time change mode after reducing the data amount of the captured image.

DESCRIPTION OF EMBODIMENTS

Configuration of Remote Operation Support System

Figure 1:
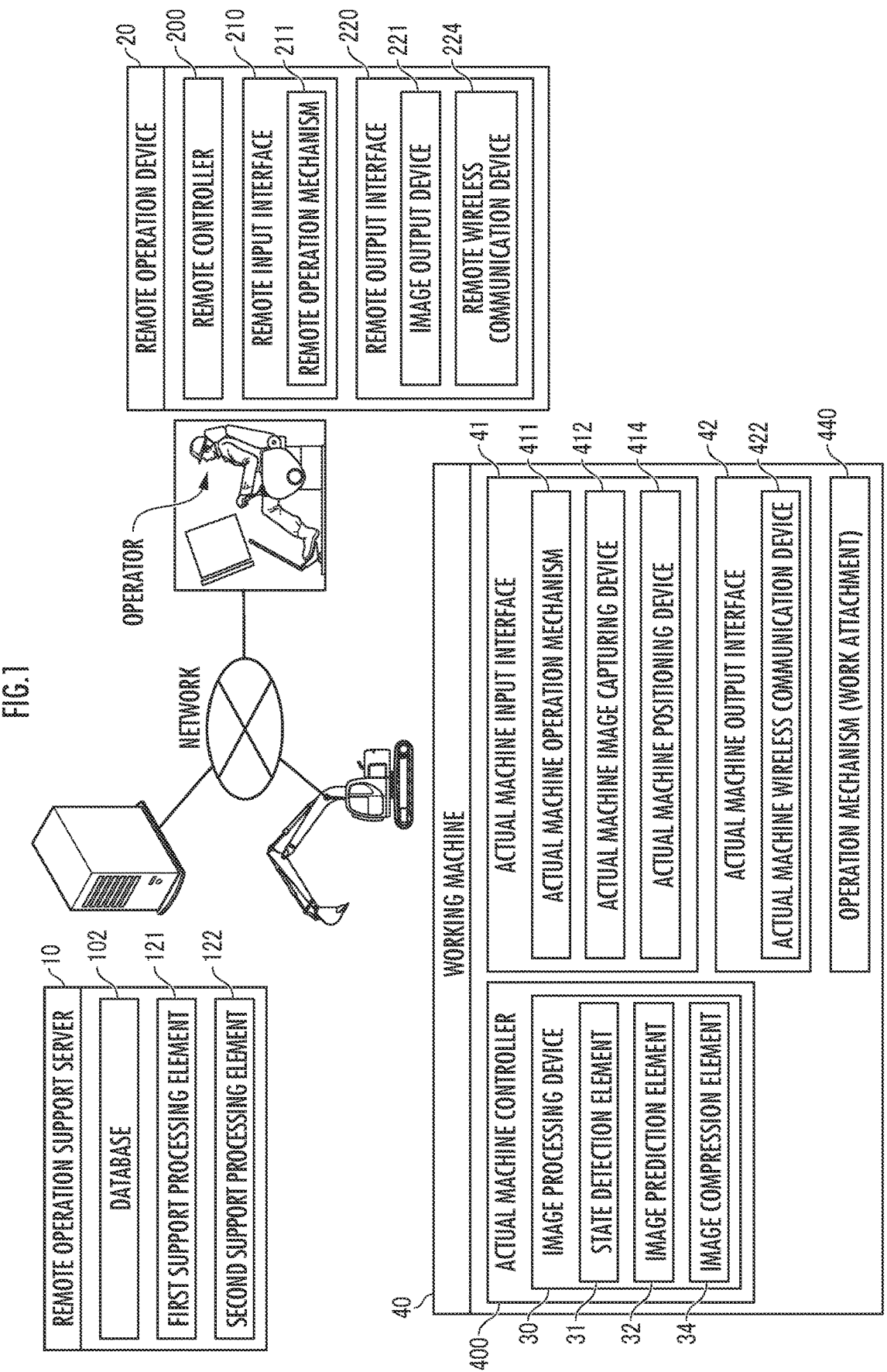
FIG. 1 is an explanatory diagram regarding a configuration of a remote operation support system and an image processing device.

The remote operation support system illustrated in FIG. 1 is configured by a remote operation support server 10, and a remote operation device 20 for remotely operating a working machine 40. The remote operation support server 10, the remote operation device 20 and the working machine 40 are configured such that network communication with each other is possible. An intercommunication network of the remote operation support server 10 and the remote operation device 20 and an intercommunication network of the remote operation support server 10 and the working machine 40 may be the same or may be different.

In addition, a remote operation is a concept meaning that an operator operates the working machine 40 from a position away from the working machine 40 without boarding the working machine 40.

Further, an operator is a concept indicating a person who operates the remote operation device 20 to maneuver the working machine 40.

Configuration of Remote Operation Support Server

The remote operation support server 10 comprises a database 102, a first support processing element 121 and a second support processing element 122. The database 102 stores and holds captured image data or the like. The database 102 may be configured by a database server different from the remote operation support server 10. The individual support processing element is configured by an arithmetic processing unit (a single-core processor or a multicore processor or a processor core configuring it), reads required data and software from a storage device such as a memory, and executes arithmetic processing to be described later according to the software for the data.

Configuration of Remote Operation Device

The remote operation device 20 comprises a remote controller 200, a remote input interface 210 and a remote output interface 220. The remote controller 200 is configured by an arithmetic processing unit (a single-core processor or a multicore processor or a processor core configuring it), reads required data and software from a storage device such as a memory, and executes arithmetic processing according to the software for the data.

The remote input interface 210 comprises a remote operation mechanism 211. The remote output interface 220 comprises a remote image output device 221 and a remote wireless communication device 224.

The remote operation mechanism 211 includes an operation device for traveling, an operation device for turning, an operation device for a boom, an operation device for an arm and an operation device for a bucket. The individual operation device includes an operation lever which receives a rotary operation. The operation lever (traveling lever) of the operation device for traveling is operated to move a lower traveling body 410 of the working machine 40. The traveling lever may also serve as a traveling pedal. For example, the traveling pedal fixed to a base part or a lower end part of the traveling lever may be provided. The operation lever (turning lever) of the operation device for turning is operated to move a hydraulic turning motor configuring a turning mechanism 430 of the working machine 40. The operation lever (boom lever) of the operation device for the boom is operated to move a boom cylinder 442 of the working machine 40. The operation lever (arm lever) of the operation device for the arm is operated to move an arm cylinder 444 of the working machine 40. The operation lever (bucket lever) of the operation device for the bucket is operated to move a bucket cylinder 446 of the working machine 40.

Figure 2:
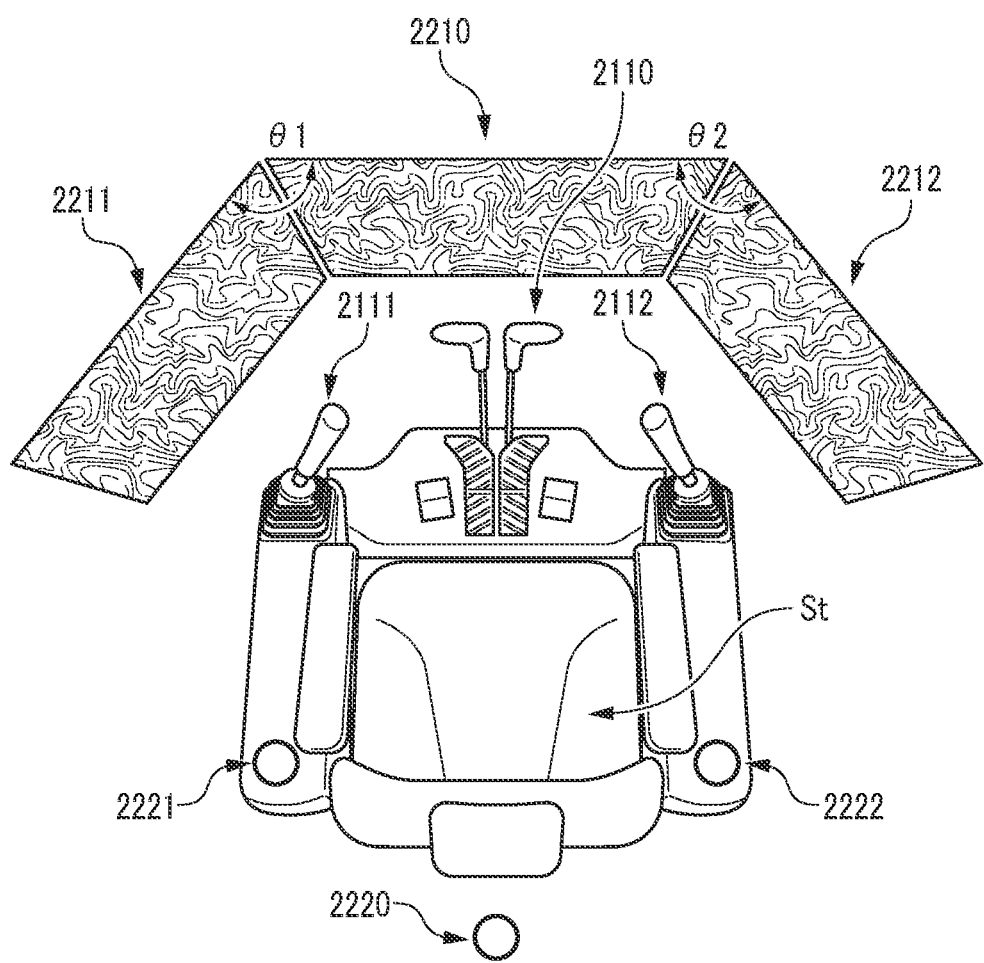
FIG. 2 is an explanatory diagram regarding a configuration of a remote operation device.

The individual operation lever configuring the remote operation mechanism 211 is, for example, arranged around a seat St for an operator to sit, as illustrated in FIG. 2. The seat St is in a form like a high back chair with armrests but may be a sitting part in an arbitrary form that the operator can sit such as a form like a low back chair without a headrest or a form like a chair without a backrest.

At the front of the seat St, a pair of left and right traveling levers 2110 according to left and right crawlers are arranged side by side on left and right. One operation lever may serve as a plurality of operation levers. For example, a left side operation lever 2111 provided on the front of a left side frame of the seat St illustrated in FIG. 2 may function as the arm lever when operated in a front-back direction and function as the turning lever when operated in a left-right direction. Similarly, a right side operation lever 2112 provided on the front of a right side frame of the seat St illustrated in FIG. 2 may function as the boom lever when operated in the front-back direction and function as the bucket lever when operated in the left-right direction. A lever pattern may be arbitrarily changed by an operation instruction by the operator.

The image output device 221 is configured by a center image output device 2210, a left side image output device 2211 and a right side image output device 2212 each provided with a roughly rectangular screen and arranged respectively at the front, oblique left front and oblique right front of the seat St, as illustrated in FIG. 2 for example. Shapes and sizes of the respective screens (image display areas) of the center image output device 2210, the left side image output device 2211 and the right side image output device 2212 may be the same or may be different.

As illustrated in FIG. 2, a right edge of the left side image output device 2211 is adjacent to a left edge of the center image output device 2210 so that the screen of the center image output device 2210 and the screen of the left side image output device 2211 form an inclination angle θ1 (for example, 120°≤θ1≤150°). As illustrated in FIG. 2, a left edge of the right side image output device 2212 is adjacent to a right edge of the center image output device 2210 so that the screen of the center image output device 2210 and the screen of the right side image output device 2212 form an inclination angle θ2 (for example, 120°≤θ2≤150°). The inclination angles θ1 and θ2 may be the same or may be different.

The respective screens of the center image output device 2210, the left side image output device 2211 and the right side image output device 2212 may be parallel to a vertical direction or may be inclined to the vertical direction. At least one image output device of the center image output device 2210, the left side image output device 2211 and the right side image output device 2212 may be configured by a plurality of divided image output devices. For example, the center image output device 2210 may be configured by a pair of image output devices which are provided with roughly rectangular screens and are adjacent up and down.

Configuration of Working Machine

The working machine 40 comprises an actual machine controller 400, an actual machine input interface 41, an actual machine output interface 42 and a working mechanism 440. The actual machine controller 400 comprises an image processing device 30. The image processing device 30 comprises a state detection element 31, an image prediction element 32 and an image compression element 34. Each of components of the actual machine controller 400 and the image processing device 30 is configured by an arithmetic processing unit (a single-core processor or a multicore processor or a processor core configuring it), reads required data and software from a storage device such as a memory, and executes arithmetic processing according to the software for the data.

Figure 3:
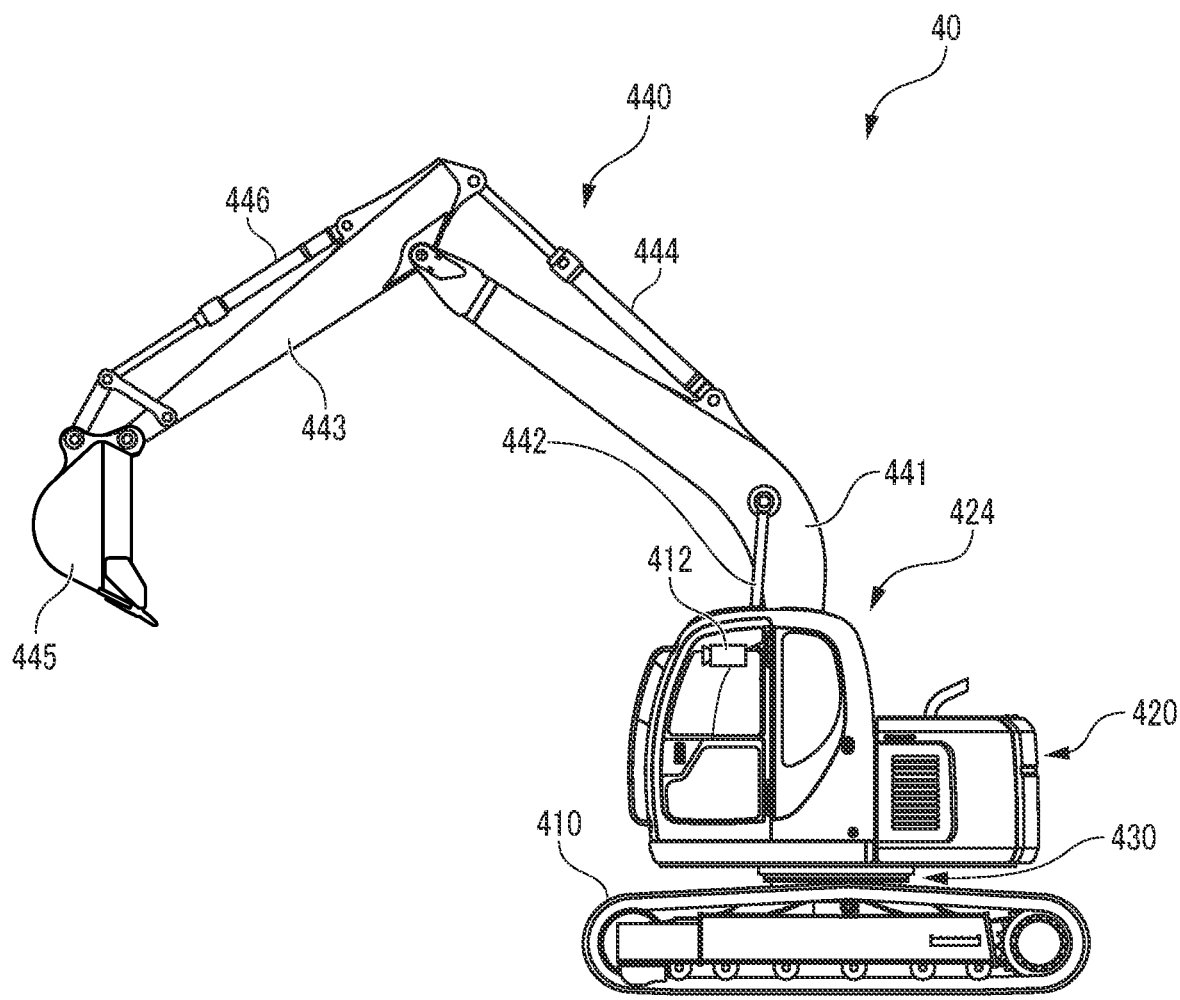
FIG. 3 is an explanatory diagram regarding a configuration of a working machine.

The working machine 40 is a crawler shovel (construction machine) for example, and as illustrated in FIG. 3, comprises the crawler type lower traveling body 410 and an upper turning body 420 loaded on the lower traveling body 410 so as to be turned via the turning mechanism 430. On a front left side part of the upper turning body 420, a cab 424 (driver's cab) is provided. On a front center part of the upper turning body 420, the working mechanism 440 is provided.

The actual machine input interface 41 comprises an actual machine operation mechanism 411, the actual machine image capturing device 412 and an actual machine positioning device 414. The actual machine operation mechanism 411 comprises a plurality of operation levers arranged similarly to the remote operation mechanism 211 around a seat arranged inside the cab 424. The cab 424 comprises a drive mechanism or a robot which receives signals according to an operation mode of a remote operation lever and moves an actual machine operation lever based on the received signals The actual machine image capturing device 412 is installed inside the cab 424 for example, and images an environment including at least a part of the working mechanism 440 over a front window and a pair of left and right side windows. Some or all of the front window and the side windows may be omitted. The actual machine positioning device 414 is configured by a GPS and a gyro sensor or the like as needed.

The actual machine output interface 42 comprises an actual machine wireless communication device 422.

As illustrated in FIG. 3, the working mechanism 440 as a working mechanism comprises a boom 441 mounted on the upper turning body 420 so as to be raised and lowered, an arm 443 rotatably connected to a distal end of the boom 441, and a bucket 445 rotatably connected to the distal end of the arm 443. The working mechanism 440 is mounted with the boom cylinder 442, the arm cylinder 444 and the bucket cylinder 446 each configured by an extendable hydraulic cylinder.

The boom cylinder 442 is interposed between the boom 441 and the upper turning body 420 so as to be extended and contracted by receiving supply of hydraulic oil and rotate the boom 441 in a raising/lowering direction. The arm cylinder 444 is interposed between the arm 443 and the boom 441 so as to be extended and contracted by receiving the supply of the hydraulic oil and rotate the arm 443 around a horizontal axis to the boom 441. The bucket cylinder 446 is interposed between the bucket 445 and the arm 443 so as to be extended and contracted by receiving the supply of the hydraulic oil and rotate the bucket 445 around the horizontal axis to the arm 443.

Functions

The basic functions of the remote operation support system of the configuration described above will be described using a flowchart illustrated in FIG. 4. In the flowchart, a block of "C●" is used for description simplification, means transmission and/or reception of data, and means conditional branching that processing in a branching direction is executed on condition that the data is transmitted and/or received.

Figure 4:
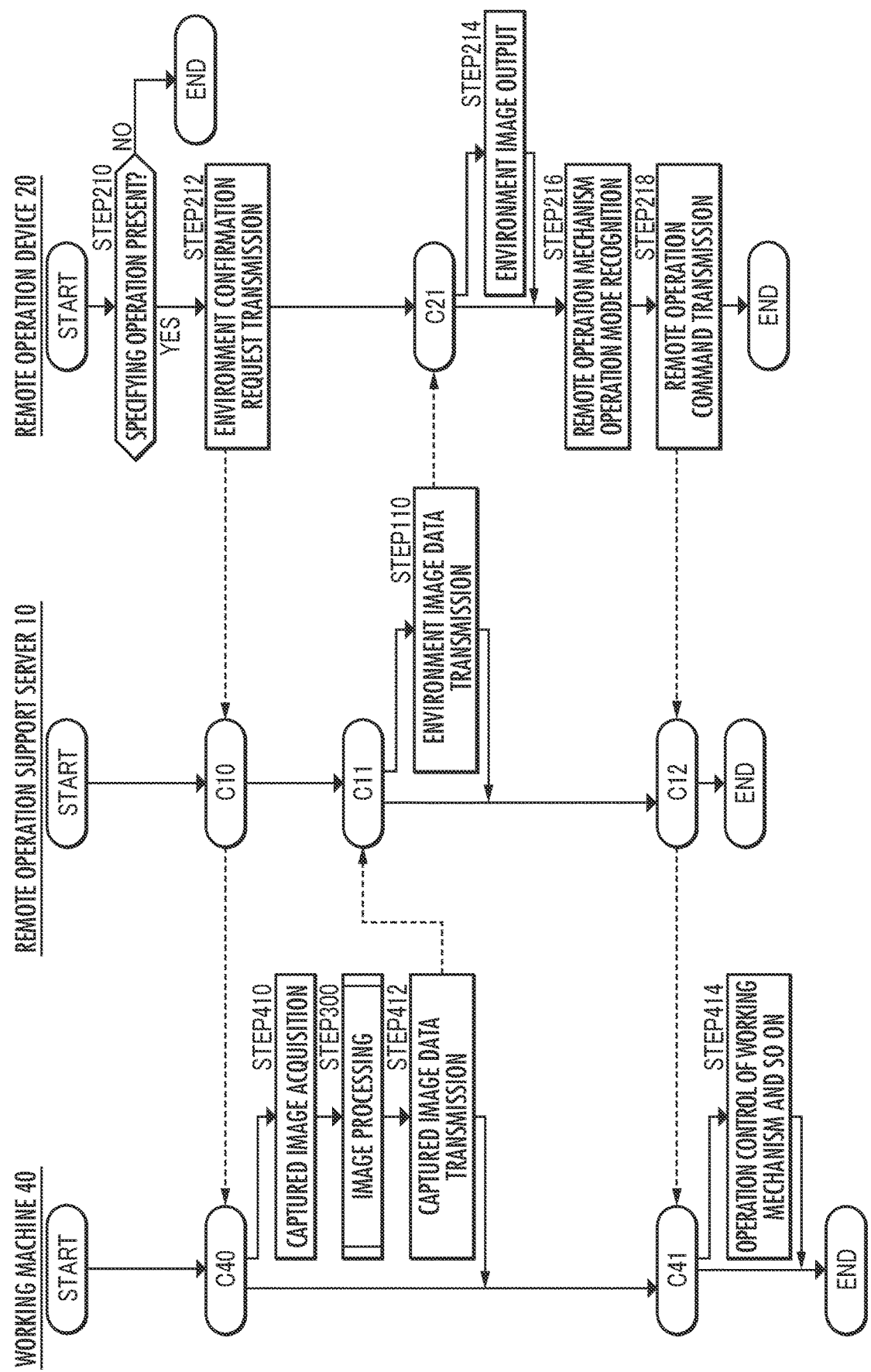
FIG. 4 is an explanatory diagram regarding a first function of a remote operation support device.

In the remote operation device 20, presence/absence of a specifying operation through the remote input interface 210 by an operator is determined (FIG. 4/STEP210). The "specifying operation" is, for example, an operation of tapping or the like in the remote input interface 210 for specifying the working machine 40 that the operator intends to remotely operate. In a case where the determination result is negative (FIG. 4/STEP210 . . . NO), a series of processing is ended. On the other hand, in the case where the determination result is affirmative (FIG. 4/STEP210 . . . YES), an environment confirmation request is transmitted to the remote operation support server 10 through the remote wireless communication device 224 (FIG. 4/STEP212).

In the remote operation support server 10, in the case where the environment confirmation request is received, the environment confirmation request is transmitted to the corresponding working machine 40 by the first support processing element 121 (FIG. 4/C10).

In the working machine 40, in the case where the environment confirmation request is received through the actual machine wireless communication device 422 (FIG. 4/C40), the actual machine controller 400 acquires a captured image through the actual machine image capturing device 412 (FIG. 4/STEP410). Here, by the image processing device 30, image processing to be described later in details is executed (FIG. 4/STEP300). By the actual machine controller 400, captured image data to which the image processing is performed is transmitted to the remote operation support server 10 through the actual machine wireless communication device 422 (FIG. 4/STEP412).

In the remote operation support server 10, in the case where the captured image data is received by the first support processing element 121 (FIG. 4/C11), environment image data according to the captured image is transmitted to the remote operation device 20 by the second support processing element 122 (FIG. 4/STEP110). The environment image data is image data indicating a simulated environment image generated based on the captured image other than the captured image data itself. In the case where the image processing device 30 is configured by the remote operation support server 10, the environment image data may be generated by the image processing of the captured image data being performed by the image processing device 30.

In the remote operation device 20, in the case where the environment image data is received through the remote wireless communication device 224 (FIG. 4/C21), the environment image according to the environment image data is outputted to the remote image output device 221 by the remote controller 200 (FIG. 4/STEP214).

Figure 7:
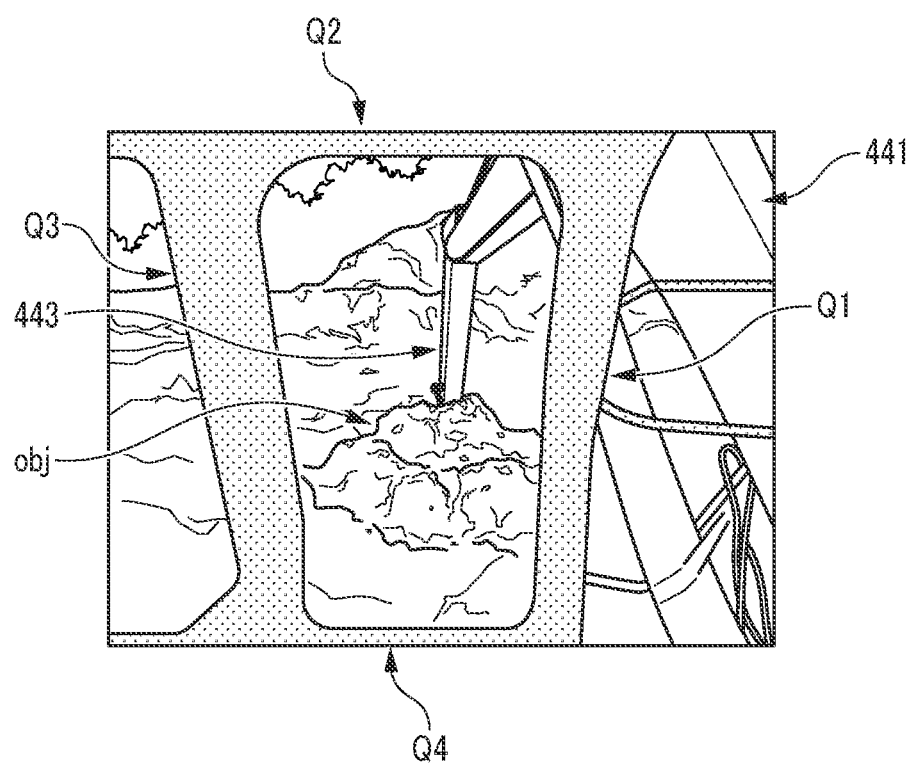
FIG. 7 is an explanatory diagram regarding a display mode of an environment image.

Thus, for example, as illustrated in FIG. 7, the environment image projecting the boom 441 and the arm 443 which are a part of the working mechanism 440 and a heap of rubble or earth and sand (which is a working object by the bucket 445) at the front of the cab 424 through a window frame demarcating the cab 424 and configured by a right window frame Q1, an upper window frame Q2, a left window frame Q3 and a lower window frame Q4 is outputted to the image output device 221.

In the remote operation device 20, the operation mode of the remote operation mechanism 211 is recognized by the remote controller 200 (FIG. 4/STEP216), and a remote operation command according to the operation mode is transmitted to the remote operation support server 10 through the remote wireless communication device 224 (FIG. 4/STEP218).

In the remote operation support server 10, in the case where the remote operation command is received by the second support processing element 122, the remote operation command is transmitted to the working machine 40 by the first support processing element 121 (FIG. 4/C12).

In the working machine 40, in the case where the operation command is received through the actual machine wireless communication device 422 by the actual machine controller 400 (FIG. 4/C41), a movement of the working mechanism 440 or the like is controlled (FIG. 4/STEP414). For example, work of scooping soil at the front of the working machine 40 by the bucket 445, turning the upper turning body 420 and then dropping the soil from the bucket 445 is executed.

Details of an image processing function (see FIG. 4/STEP300) of the image processing device 30 of the configuration described above will be described using a flowchart illustrated in FIG. 5.

In the image processing device 30, by the state detection element 31, a moving mode of the working machine 40 is recognized or detected based on output signals of various kinds of sensors loaded on the working machine 40 (FIG. 5/STEP302). Alternatively, by the state detection element 31, the operation mode of the remote operation mechanism 211 may be recognized based on communication with the remote operation device 20 (see FIG. 4/STEP216).

By the image prediction element 32, based on the moving mode of the working machine 40, whether or not a data amount when the captured image is encoded using inter-frame prediction is to exceed a threshold is determined (FIG. 5/STEP304). For the captured image of one frame as an input image, the captured image of another frame after second delay time $\tau 2$ as a prediction image is predicted based on the moving mode of the working machine 40, and whether or not the data amount when a difference between the input image and the prediction image is encoded is to exceed the threshold is determined. The second delay time $\tau 2$ is delay time until the moving mode of the working machine 40 is reflected in the captured image indicating the situation of the working machine 40 and the environment thereof.

For the captured image of one frame as the input image, the captured image of another frame after first delay time $\tau 1$ as the prediction image may be predicted based on the moving mode of the working machine 40, and whether or not the data amount when the difference between the input image and the prediction image is encoded is to exceed the threshold may be determined. The first delay time $\tau 1$ is the delay time until the remote operation mode of the working machine 40 in the remote operation device 20 is reflected in the captured image indicating the situation of the working machine 40 and the environment thereof.

For example, in the case where the upper turning body 420 turns to the lower traveling body 410, in the case where the bucket 445 moves bit by bit when shaking off earth and sand scooped by the bucket 445 (work part), and in the case where the upper turning body 420 largely vibrates when the working machine 40 is moved by a movement of the lower traveling body 410, the difference between the input image and the prediction image becomes large. In these cases, as illustrated in FIG. 8A for example, in a period from a time t1 to a time t2, there are cases where the data amount (see a solid line) when the difference is encoded exceeds the threshold (see a broken line). The fact that the data amount of the captured image is to exceed the threshold at the time t1 can be predicted based on the moving mode of the working machine 40 (or the operation mode of the remote operation mechanism 211) at the time the second delay time $\tau 2$ (or the first delay time $\tau 1$) before.

The threshold may be set adaptively or beforehand based on a height of a communication speed of the captured image data among the working machine 40, the remote operation support server 10 and the remote operation device 20, stability of the communication speed and/or communication charges.

In the case where the determination result is negative (FIG. 5/STEP304 . . . NO), the captured image data is compressed as usual by the image compression element 34 (FIG. 5/STEP308). Specifically, as illustrated in FIG. 6A, parameter change processing and encoding processing by inter-frame prediction are performed to the captured image captured by the actual machine image capturing device 412.

The parameter change processing is the processing of reducing the data amount of the captured image. For example, the processing of lowering a resolution (averaging processing with adjacent pixels), raising luminance (uniformly bringing all pixels to white), lowering the luminance (uniformly bringing all the pixels to black) or lowering contrast or the like is performed.

The inter-frame prediction is the processing of creating the prediction image for the input image and encoding the difference between the input image and the prediction image.

On the other hand, in the case where the determination result is affirmative (FIG. 5/STEP304 . . . YES), the captured image data is processed and compressed so that the data amount of the captured image becomes equal to or smaller than the threshold by the image compression element 34 (FIG. 5/STEP306).

Figure 6B:
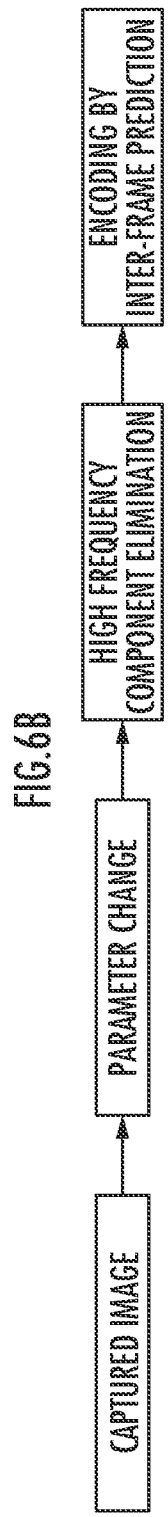
FIG. 6B is an explanatory diagram regarding the compression of the data amount of the captured image.

Specifically, as illustrated in FIG. 6B, the parameter change processing, high frequency component elimination processing and the encoding processing by the inter-frame prediction are performed to the captured image captured by the actual machine image capturing device 412. As the parameter change processing, the resolution may be lowered by the averaging processing of the adjacent pixels (for example, the resolution is changed from 3840*2160 to 1920*1080). As the parameter change processing, the luminance of all the pixels may be evenly increased by a specified value. When all the pixels are uniformly brought closer to white, compression is facilitated. As the parameter change processing, the luminance of all the pixels may be evenly reduced by a specified value. When all the pixels are uniformly brought closer to black, the compression is facilitated. As the parameter change processing, the contrast may be lowered by uniformly multiplying the contrast of all the pixels by a predetermined value 1/X. The parameter change processing and the encoding processing by the inter-frame prediction are similar to usual compression processing illustrated in FIG. 6A.

Figure 9:
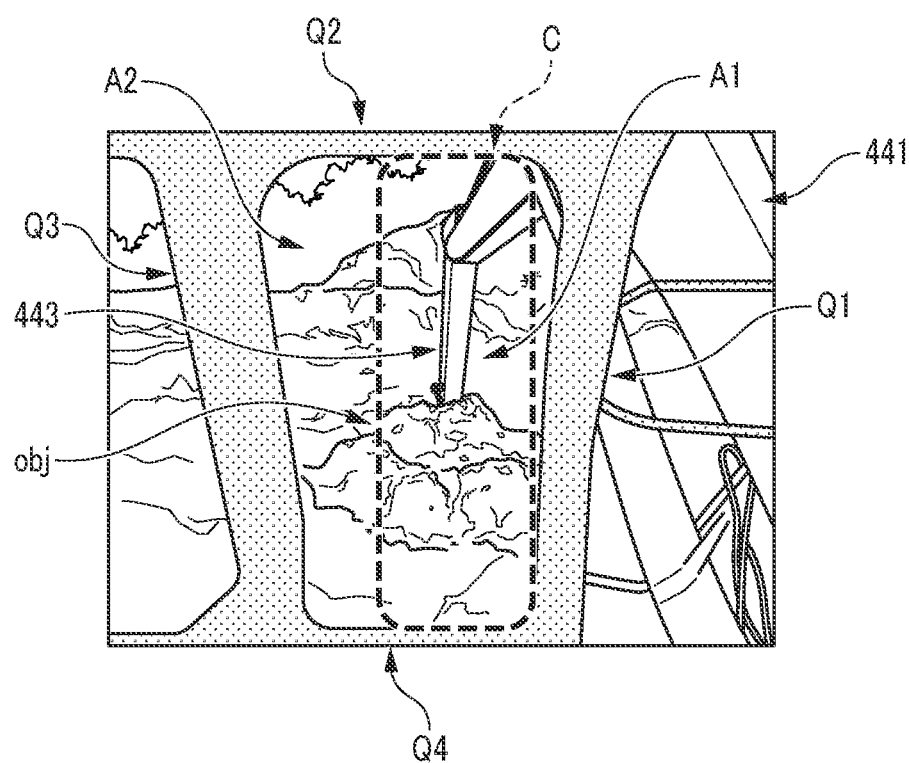
FIG. 9 is an explanatory diagram regarding a specified mode of first and second specified image areas.

When performing the high frequency component elimination processing, first, based on the moving mode of the working machine 40 detected by the state detection element 31, a first specified image area configuring a part of the captured image is specified by the image compression element 34. For example, in the case of the moving mode of moving the working mechanism 440 and scooping rubble or the like from one spot and placing it to another spot by the bucket 445, as illustrated in FIG. 9, an image area including at least a part of the working mechanism 440 and a heap obj of rubble or earth and sand, the image area being surrounded by a roughly rectangular boundary line C of which upper and lower parts are demarcated by the upper window frame Q2 and the lower window frame Q4 respectively, is specified as a first specified image area A1. An occupancy area of the first specified area A1 in the captured image may be set smaller as a threshold exceeding amount of the data amount of the captured image becomes larger.

Figure 10:
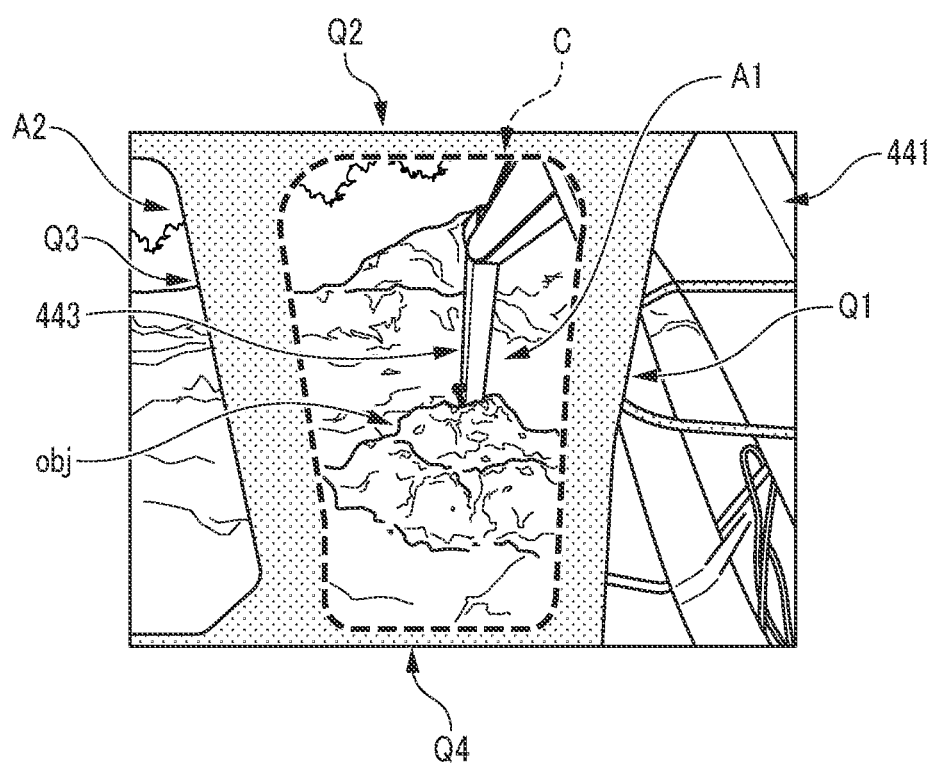
FIG. 10 is an explanatory diagram regarding the specified mode of the first and second specified image areas.

In addition, in the case of the moving mode of scooping rubble or the like from one spot and placing it to another spot by the bucket 445 while turning the upper turning body 420 alternately to left and right to the lower traveling body 410 in addition to moving the working mechanism 440, as illustrated in FIG. 10, the image area wider than FIG. 9 including at least a part of the working mechanism 440 and the heap obj of rubble or earth and sand, the image area being surrounded by the boundary line C entirely demarcated by the whole window frames, may be specified as the first specified image area A1.

Further, in the case of the moving mode of turning the upper turning body 420 in a left direction to the lower traveling body 410, the image area on a left side of the left window frame Q3 may be specified as the first specified image area A1, in addition to at least a part of the image area on an inner side of the window frame. Similarly, in the case of the moving mode of turning the upper turning body 420 in a right direction to the lower traveling body 410, the image area on a right side of the right window frame Q1 may be specified as the first specified image area A1, in addition to at least a part of the image area on the inner side of the window frame.

Figure 11:
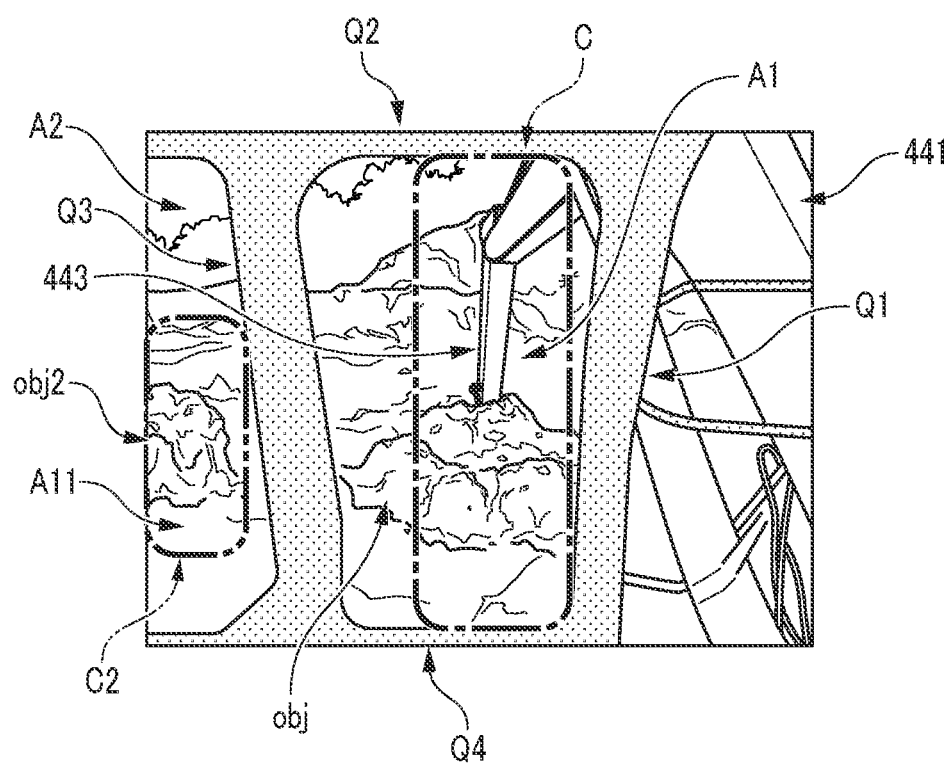
FIG. 11 is an explanatory diagram regarding the specified mode of the first and second specified image areas in a case where a specified target object is included in the captured image.

As illustrated in FIG. 11, in the case where a specified target object obj2 such as a truck or a worker is extracted on the left side of the left window frame Q3 or the like in the captured image, the image area on the inner side of a boundary line C2 surrounding the specified target object obj2 may be specified as a first specified image area A11. In FIG. 11, similarly to FIG. 9, the image area including at least a part of the working mechanism 440 and a heap obj of rubble or earth and sand, the image area being surrounded by the roughly rectangular boundary line C of which upper and lower parts are demarcated by the upper window frame Q2 and the lower window frame Q4 respectively, is specified as the first specified image area A1.

Then, high frequency components exceeding a specified frequency in a second specified image area A2 excluding the first specified image area A1 of the captured image are eliminated. At the time, for example, a method of eliminating the high frequency components with a small information amount after performing DST (discrete cosine transformation), that is, dividing the image into areas of 8×8 pixels and performing spatial frequency transformation in each divided area is used. Thus, the environment image in which the contrast in the second specified image area A2 is unclear (blurry) while the contrast in the first specified image area A1 is clear is outputted to the image output device 221 in the remote operation device 20 (see FIG. 4/STEP214, FIG. 9, FIG. 10 and FIG. 11).

Effects

According to the image processing device 30 configuring the remote operation support system of the configuration, in the case where it is predicted that the data amount of the captured image is to exceed the threshold in consideration of a detection result of the moving mode of the working machine 40, the high frequency components exceeding the specified frequency in the second specified image area A2 excluding the first specified image area A1 of the captured image are eliminated (see FIG. 5/STEP304 . . . YES→STEP306, FIG. 9, FIG. 10 and FIG. 11). Thus, for example, as illustrated in FIG. 8B, the data amount (see the solid line) of the captured image is reduced so that the data amount becomes equal to or smaller than the threshold even in the period from the time t1 to the time t2. Then, not only inter-frame continuity of the first specified image area A1 of the environment image outputted to the image output device 221 of the remote operation device 20 but also visibility by an operator is improved.

In the image processing device of the present invention, it is preferable that the image prediction element predicts, as a prediction image, the captured image after first delay time until the remote operation mode of the working machine in the remote operation device is reflected in the captured image indicating a situation of the working machine and the environment thereof or second delay time until the moving mode of the working machine is reflected in the captured image indicating the situation of the working machine and the environment thereof, based on the remote operation mode of the working machine by the remote operation device or the moving mode of the working machine detected by the state detection element, for the captured image of one frame corresponding to the captured image data as an input image, and predicts whether or not the data amount when a difference between the input image and the prediction image is encoded is to exceed the threshold.

According to the image processing device of the configuration, by considering the first delay time until the remote operation mode of the working machine in the remote operation device is reflected in the captured image indicating the situation of the working machine and the environment and/or the second delay time until the moving mode of the working machine is reflected in the captured image indicating the situation of the working machine and the environment thereof, whether or not the data amount when the difference between the input image and the prediction image is encoded is to exceed the threshold is predicted. Then, in the case where it is predicted that the data amount when encoding is performed is to exceed the threshold, the high frequency components exceeding the specified frequency in the second specified image area excluding the first specified image area of the captured image are eliminated. Thus, the data amount of the captured image is reduced, and not only the inter-frame continuity of the first specified image area of the image outputted to the image output device of the remote operation device but also the visibility by an operator is improved.

In the image processing device of the present invention, it is preferable that the image compression element specifies the first specified image area configuring a part of the captured image based on the remote operation mode of the working machine by the remote operation device or the moving mode of the working machine detected by the state detection element.

According to the image processing device of the configuration, the first specified image area can be specified in the captured image so as to include an object (for example, a part of the working machine or an object present around the working machine) for which it is predicted that an inter-frame difference is to exceed the threshold, that is, for which it is predicted that the movement or a displacement amount is relatively large in consideration of the remote operation mode of the working machine by the remote operation device or the moving mode of the working machine. Thus, not only the visibility of the object which is outputted to the image output device configuring the remote operation device, and for which it is predicted that the movement or the displacement amount is relatively large, is improved but also the remote operation of the working machine by the remote operation device based on the visual recognition result is facilitated for an operator.

In the image processing device of the present invention, it is preferable that the image compression element specifies an image area at least partially demarcated by a window frame demarcating a crew cabin of the working machine as the first specified image area, in the captured image indicating the situation outside the crew cabin through the window frame, which is captured by the actual machine image capturing device disposed inside the crew cabin.

According to the image processing device of the configuration, the continuity of the image outputted to the image output device of the remote operation device appropriately from a viewpoint of smoothness of the operation of the operator is improved, in consideration of a high probability of concentration of operator's attention on the image area at least partially demarcated by the window frame demarcating the crew cabin, in the captured image outputted to the image output device configuring the remote operation device.

REFERENCE SIGNS LIST

10 . . . remote operation support server, 20 . . . remote operation device, 30 . . . image processing device, 31 . . . state detection element, 32 . . . image prediction element, 34 . . . image compression element, 40 . . . working machine, 102 . . . database, 121 . . . first support processing element, 122 . . . second support processing element, 200 . . . remote controller, 210 . . . remote input interface, 211 . . . remote operation mechanism, 220 . . . remote output interface, 221 . . . image output device, 224 . . . remote wireless communication device, 400 . . . actual machine controller, 41 . . . actual machine input interface, 42 . . . actual machine output interface, 424 . . . cab (driver's cab), 440 . . . working mechanism, 445 . . . bucket (work part), 412 . . . actual machine image capturing device.

The invention claimed is:

1. An image processing device comprising:
a state detection element for detecting a remote operation mode of a working machine by a remote operation device or a moving mode of the working machine;
an image prediction element configured to predict whether or not a data amount of a captured image indicating the captured image of the working machine and an environment thereof captured by an actual machine image capturing device is to exceed a threshold, based on the remote operation mode of the working machine by the remote operation device or the moving mode of the working machine detected by the state detection element; and
an image compression element configured to eliminate high frequency components exceeding a specified frequency in a second specified image area excluding a first specified image area of the captured image on condition that it is predicted that the data amount of the captured image is to exceed the threshold by the image prediction element.

2. The image processing device according to claim 1, wherein the image prediction element predicts, as a prediction image, the captured image after first delay time until the remote operation mode of the working machine in the remote operation device is reflected in the captured image indicating a situation of the working machine and the environment thereof or second delay time until the moving mode of the working machine is reflected in the captured image indicating the situation of the working machine and the environment thereof, based on the remote operation mode of the working machine by the remote operation device or the moving mode of the working machine detected by the state detection element, for the captured image of one frame corresponding to data of the captured image as an input image, and
predicts whether or not the data amount when a difference between the input image and the prediction image is encoded is to exceed the threshold.

3. The image processing device according to claim 1, wherein the image compression element specifies the first specified image area configuring a part of the captured image based on the remote operation mode of the working machine by the remote operation device or the moving mode of the working machine detected by the state detection element.

4. The image processing device according to claim 3, wherein the image compression element specifies an image area at least partially demarcated by a window frame demarcating a crew cabin of the working machine as the first specified image area, in the captured image indicating the situation outside the crew cabin through the window frame, which is captured by the actual machine image capturing device disposed inside the crew cabin.

5. An image processing method comprising:
a state detection step for detecting a remote operation mode of a working machine by a remote operation device or a moving mode of the working machine;
an image prediction step of predicting whether or not a data amount of a captured image indicating the captured image of the working machine and an environment thereof captured by an actual machine image capturing device is to exceed a threshold, based on the remote operation mode of the working machine by the remote operation device or the moving mode of the working machine detected in the state detection step; and
an image compression step of eliminating high frequency components exceeding a specified frequency in a second specified image area excluding a first specified image area of the captured image on condition that it is predicted that the data amount of the captured image is to exceed the threshold in the image prediction step.

* * * * *